(12) United States Patent
Kawashima

(10) Patent No.: US 8,818,471 B2
(45) Date of Patent: Aug. 26, 2014

(54) SUPERCONDUCTING COIL APPARATUS

(75) Inventor: Hiroshi Kawashima, Hyogo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 446 days.

(21) Appl. No.: 12/631,368

(22) Filed: Dec. 4, 2009

(65) Prior Publication Data

US 2010/0323900 A1    Dec. 23, 2010

(30) Foreign Application Priority Data

Dec. 11, 2008   (JP) .................................. 2008-315238

(51) Int. Cl.
*H01B 12/00*   (2006.01)

(52) U.S. Cl.
USPC .......................................... 505/211; 336/170

(58) Field of Classification Search
USPC .......................................... 505/211; 336/170
See application file for complete search history.

(56) References Cited

U.S. PATENT DOCUMENTS

| | | | | |
|---|---|---|---|---|
| 4,151,498 | A | * | 4/1979 | Katsurai ........................ 335/216 |
| 4,664,868 | A | * | 5/1987 | Kuno et al. .................... 376/142 |
| 4,920,095 | A | * | 4/1990 | Ishigaki et al. ............... 505/211 |
| 5,130,687 | A | * | 7/1992 | Evrard et al. ................. 335/216 |
| 5,909,167 | A | * | 6/1999 | Muller .......................... 336/225 |

FOREIGN PATENT DOCUMENTS

| | | |
|---|---|---|
| JP | 50145795 A | 11/1975 |
| JP | 53088498 A | 8/1978 |
| JP | 56046486 A | 4/1981 |
| JP | 57106008 A | 7/1982 |
| JP | 58-56242 B2 | 12/1983 |
| JP | 6033082 A | 2/1985 |
| JP | 61-139786 A | 6/1986 |
| JP | 61-60564 B2 | 12/1986 |
| JP | 6159646 B2 | 12/1986 |
| JP | 6329810 B2 | 6/1988 |
| JP | 3135077 A | 6/1991 |
| JP | 2663876 A | 4/1997 |
| JP | 10104376 A | 4/1998 |
| JP | 11262200 A | 9/1999 |
| JP | 2004179550 A | 6/2004 |

OTHER PUBLICATIONS

International Search Report and Written Opinion of PCT/JP2009/069979 dated Mar. 2, 2010.
Office Action as mailed on Mar. 14, 2013 in corresponding Japanese Application No. 2008-315238.
Notice of Allowance as mailed on Feb. 1, 2013 in corresponding Korean Patent Application No. 2011-7000657, with partial English translation.
Notification of the decision to grant a patent dated Aug. 12, 2013, corresponds to Japanese patent application No. 2008-315238.

* cited by examiner

*Primary Examiner* — Paul Wartalowicz
(74) *Attorney, Agent, or Firm* — Manabu Kanesaka; Benjamin J. Hauptman

(57) ABSTRACT

It is desired to perform assemble, disassemble, maintenance and the like, especially of a large site superconducting coil device, in a short time. The superconducting coil device includes a plurality of coil units arranged in a circle circumference to form a toroidal shape. Each of the plurality of coil units includes a cryostat and a superconducting coil stored in the cryostat, and has a first surface parallel with a radius of the circle circumference and a second surface parallel with the radius of the circle circumference and arranged in a first direction side of the circle circumference to the first surface. The first surface contacts with the second surface of a coil unit adjacent in one direction among the plurality of coil units. The second surface contacts with the first surface of a coil unit adjacent in other direction among the plurality of coil units.

9 Claims, 5 Drawing Sheets

SUPERCONDUCTING COIL APPARATUS

INCORPORATION BY REFERENCE

The present invention claims priority under the Convention based on Japanese patent application No. 2008-315238. Disclosed content of the Japanese patent application is incorporated herein by reference.

TECHNICAL FIELD

The present invention relates to a structure of a superconducting coil device.

BACKGROUND ART

There is known a superconducting magnetic energy storage (SMES) that stores energy by flowing current through a coil in the superconducting state. The superconducting coil of the SMES are collectively contained in a vacuum insulating container in a factory or onsite. To achieve the superconducting state, the superconducting coils are cooled by a forced circulation cooling or immersion cooling system using liquid helium.

In recent years, it is expected to achieve larger size superconducting coil devices. In a large size superconducting coil device, coil incorporating work and final assembling work of the container are required to be implemented on site. Further, after the assembling work, work for initial cooling of the coil into a cryogenic state is performed. For these pieces of work, work on site and a lot of time are required, which causes high cost and an increase in the work period.

Also, at the time of occurrence of a malfunction, or maintenance, it is required for the entire device to be subjected to vacuum break to raise temperature, and in the case of a large size device, a long time is required before resumption of operation. Further, the number of man-hours for disassembling and assembling work on site is large. For these reasons, the device should be stopped for a long time, which may cause problems in an operational aspect of facilities.

In a superconducting coil, a magnetic circuit such as a multipole system or a toroidal arrangement system is used. In a superconducting coil device of the multipole system, a superconducting coil is cylindrically wound and layered, and further a plurality of coils are arranged, which are contained in a vacuum insulating container. The inside of the vacuum insulating container is typically cooled by liquid helium. Inside a vacuum chamber of the vacuum insulating container, a radiation shield is installed to reduce heat intrusion due to radiation from outside. The radiation shield is formed by layering material having a radiation heat reflecting surface. The liquid helium inside the container is vaporized by loss due to energizing or charging/discharging of the coils, or heat intrusion from outside. The vaporized helium is cooled and recondensed by a refrigerator provided on or outside the insulating container to return to the liquid, which is again used for cooling the coils.

On the other hand, in a superconducting coil device of the toroidal arrangement system, element coils are annularly arranged, and therefore upon energizing, inward force by its corresponding magnetic circuit acts on the coils. In order to support the inward force and self-weights of the coils, a support member for supporting them from outer diameter sides of the element coils is provided.

The superconducting coil device used for the SMES includes: a coil part that stores electrical energy in the form of the DC magnetic field; a cryostat that is a storing container for keeping the coil part at a cryogenic temperature; a refrigerator- or refrigerant-based cryogenic cooling device that is intended to bring the coil part and a current lead part into a cryogenic state; the current lead that is used for a conductive circuit for transferring electricity between a cryogenic region and a room temperature region, and the like.

In addition, in the case of the toroidal arrangement coil in which the element coils are arranged in a circumferential direction to form a circumferential direction magnetic circuit, there is required a support system for respective forces including the centrally directed inward force generated in each of the element coils by a magnetic field, attractive or repulsive force between the element coils generated due to the magnetic field unbalance between the element coils, and the self-weights of the coils.

Conventional superconducting devices have some problems as follows:

(1) In the case of employing the toroidal arrangement, the planar projection shape is a ring shape, i.e., a disc shape with a hole. When larger size devices are fabricated in future, it is required to divide the coil container and to reassemble the divided pieces on site because of dimension and weight limitations upon carriage, and assembling including attachment of coils, welding work, and airtightness test is required on site. For this reason, various disadvantages such as unsatisfactory work quality, increase in the work period, and high cost are expected.

(2) If nonconformity appears in a coil part, an internal part, or an peripheral system, there are required temperature rising, vacuum break, cut and open of the cryostat, extraction of nonconforming parts, repair in a factory or the like, reassembling of the repaired part, restoration of the cryostat, vacuuming, and cooling for achieving the superconducting state. For these works, a period of time of the order of months, and a lot of labor are required, so that it is not possible to cope with the nonconformity in a realistic way.

(3) Even in the case of a problem occurring at a single part, it is required to stop the entire device and to open the entire device to cope with the problem. Works required for the stop and reactivation should be performed for the entire device, so that the work load becomes enormous. Even in the case of the cooling work, the reservation amount of initial cooling devices should be enormous. If the amount of the initial cooling device is limited, it takes long time for the reactivation.

(4) In the toroidal arrangement, the element coils are supported from the outer diameter side; however, the outer diameter sides of the element coils have poor accuracy in shape due to winding work for wire lap winding. Because the plurality of coils are arranged in the circumferential direction, problems of breakage and characteristic deterioration due to load nonuniformity in the respective coils and among the coils are concerned. Conventionally, the support for the attractive or repulsive force between the coils generated due to the magnetic field unbalance between the element coils has not been taken into account.

In association with the above description, Japanese Patent Publication JP-A-Heisei, 10-104376A (referred to as the first conventional example) discloses a vacuum vessel for a nuclear fusion device that confines plasma and is configured by being divided into multiple sectors in a torus direction, in which dross receivers are provided along and outside multiple-divided sector division lines.

Also, Japanese Patent Publication JP2004-179550A (the second conventional example) discloses a split type cylindrical magnetic shielding apparatus including a plurality of C-shaped shaking blocks having a C-shaped cross-section and a predetermined length along an axial direction in order to form therein a magnetic shield space through a combination, wherein the C-shaped shaking block includes: a magnetic material layer formed of a magnetic material having a rectangular magnetizing characteristic and the C-shaped cross-section coupled with an internal layer and an external layer extended in the axial direction; and a coil wound at least to a part of the internal layer or the external layer of the magnetic material layer for applying a magnetic shaking current to the C-shaped shaking blocks.

Further, Japanese Patent No. 2633876 (the third conventional example) discloses a nuclear fusion device including: a hollow circular body vacuum vessel that confines plasma therein and is supported by a base through supporting legs; a plurality of superconducting toroidal field coils that surround the vacuum vessel, are arranged in a torus circumferential direction at predetermined intervals, and are respectively supported by the base through heat-insulating supporting pillars; and a heat insulating vacuum vessel that contains the superconducting toroidal field coils and the vacuum vessel, wherein each of the superconducting toroidal field coils and vacuum vessel is horizontally movably supported to the heat insulating vacuum vessel by a supporting device.

SUMMARY OF INVENTION

A superconducting coil according to a present invention includes a plurality of coil units arranged in a circle circumference to form a toroidal shape. Each of the plurality of coil units includes a cryostat and a superconducting coil stored in the cryostat, and has a first surface parallel with a radius of the circle circumference, and a second surface parallel with the radius of the circle circumference and arranged in a first direction side of the circle circumference to the first surface. The first surface contacts with the second surface of a coil unit adjacent in one direction among the plurality of coil units. The second surface contacts with the first surface of a coil unit adjacent in other direction among the plurality of coil units.

In the superconducting coil device according to a present invention, an attractive force toward a center of the circle circumference is biased to the superconducting coil by an electromagnetic force generated by the superconducting coil when a current is supplied to the superconducting coil. Each of the plurality of coil units is supported in a predetermined position in a radial direction of the circle circumference by its first surface being pushed to the second surface of a coil unit adjacent in the one direction among the plurality of coil units, and its second surface being pushed to the first surface of a coil unit adjacent in the other direction among the plurality of coil units. The attractive force toward the center of the circle circumference makes smaller a diameter of the circle circumference formed by the plurality of coil units, and thereby force pressing the plurality of coil units against one another simultaneously acts on a whole of the toroidal shape to integrate the plurality of coil units. In a superconducting coil according to a present invention, the superconducting coil is a wire rod wound in a circle circumference around a central axis being the circle circumference at a corresponding position.

In a superconducting coil according to a present invention, the superconducting coil includes: a coil support member; and a coil wire rod supported by the coil support member. The first surface and the second surface are surfaces of the coil support member. The superconducting coil device according to a present invention further includes a connecting parts respectively fix a relative position of the coil support members of coil units adjacent to each other among the plurality of coil units at the first surface and the second surface in a radial direction of the circle circumference. The superconducting coil device according to a present invention further includes: a sliding mechanism configured to slidably connect the superconducting coil to the cryostat in a same coil unit with keeping airtightness of the cryostat. The superconducting coil device according to a present invention further includes: an inward load biasing device configured to apply a bias force toward a center of the circle circumference to each of the plurality of coil units. In a superconducting coil according to a present invention, each of the plurality of coil units comprises a plurality of cooling apparatuses configured to cool the superconducting coil. The plurality of cooling apparatuses are arranged in a direction of a small circle circumference having a center on the circle circumference at a corresponding position of the circle circumference. In a superconducting coil according to a present invention, in a plurality of element coils are stored in each of the cryostat of the plurality of coil units, and relative relations between the plurality of element coils are fixed by connections via inter-coil spacers.

According to the present invention, assembling, particularly in the case of a large size superconducting coil device, disassembling, maintenance and the like can be performed in a short time.

DETAILED DESCRIPTION OF THE PREFERRED EMBODIMENTS

Figure 1:
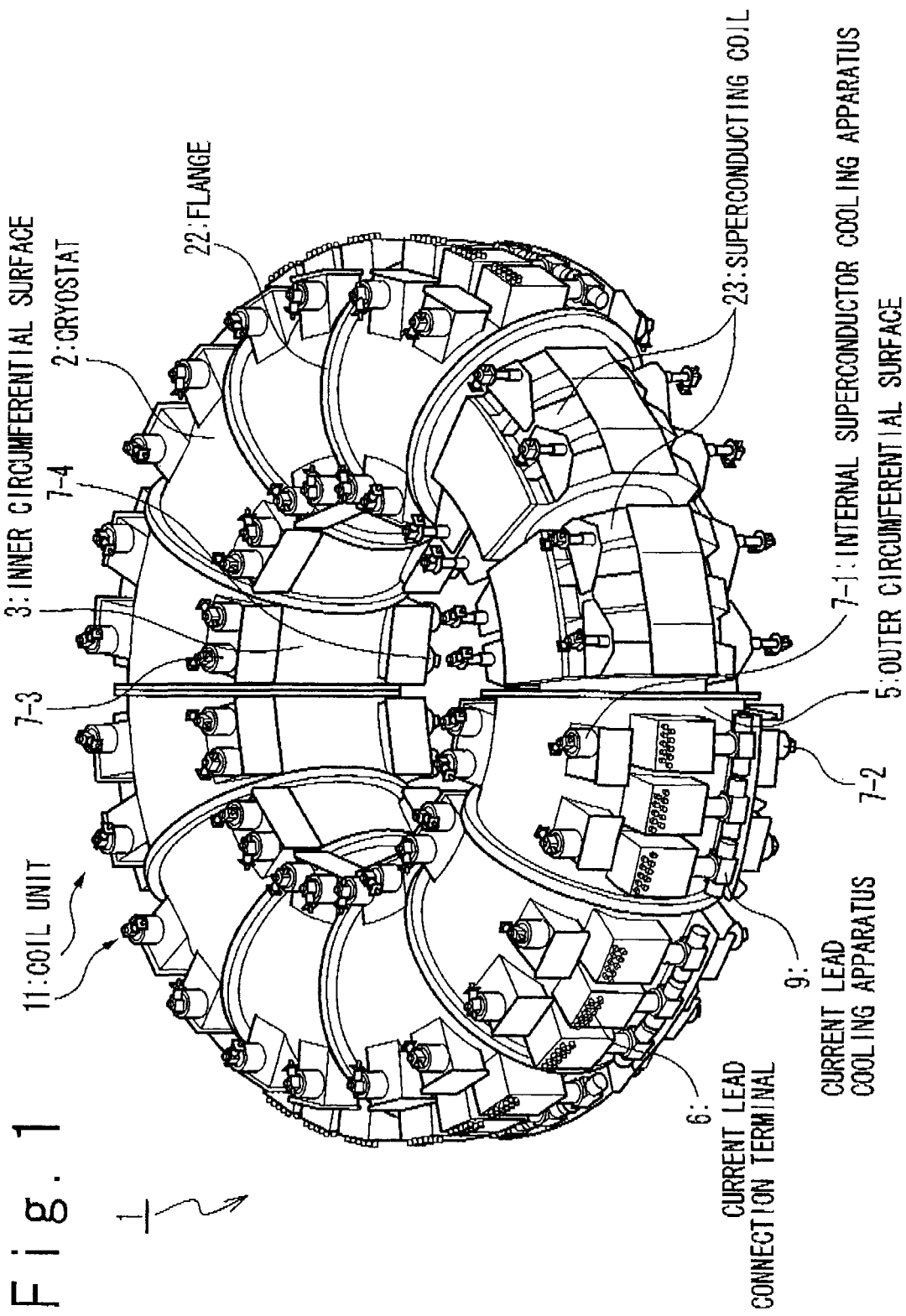
FIG. 1 illustrates a superconducting coil device in an embodiment of the present invention.

A superconducting coil device 1 of the present invention will hereinafter be described referring to the drawings.

FIG. 1 is a superconducting coil device 1 in an embodiment of the present invention. In the present embodiment, the superconducting coil device 1 serves as an SMES (Superconducting Magnetic Energy Storage). The superconducting coil device 1 includes a plurality of coil units 11 that are arranged in a horizontal plane and in a circular ring and supported on a floor surface. Each of the plurality of coil units 1 can be connected to or removed from neighboring ones through flanges 22 with vacuum sealing thereof being kept. A schematic shape of each of the plurality of coil units 11 is a tube shape having, as both end surfaces, cutting surfaces cut by a vertical plane positioned at a predetermined first angle and a vertical plane positioned at a predetermined second angle in the toroidal direction as viewed from the center of the torus shape.

Each of the coil units 11 includes a cryostat (vacuum heat-insulating container) 2. Inside each of the cryostats 2, an element coil (superconducting specification) 4 constituting (a part of) a toroidal coil is arranged. In FIG. 1, a graphical indication of some of the cryostats 2 is omitted to thereby depict the element coils 4 inside the cryostats 2. In the following description, a large circle circumference connecting centers of the element coils 4 that are respectively provided for the plurality of coil units 11 and annularly wound is referred to as a device circle circumference. The element coil 4 is a coil formed of wire rod wound along a circle circumference of which a central axis corresponds to the device circle circumference at a position at which the element coil 4 is arranged.

The element coil 4 is arranged inside the cryostat 2. Around the cryostat 2, internal superconductor cooling apparatuses 7-1 to 7-4 are arranged. In FIG. 1, the internal superconductor cooling apparatuses 7-1 to 7-4 are arranged such that two of them are arranged in a direction along the device circle circumference of each of the coil units 11, and four of them are arranged in a direction of a circle circumference (hereinafter referred to as a small circle circumference) of each of the toroidal type element coils 4 stored in the coil units 11. Outside the cryostat 2 of each of the coil units 11, current lead connection terminals 6 are attached. The current lead connection terminals 6 are terminals for making electrical connections between the element coil 4 and external devices. Current lead cooling apparatuses 9 for cooling current leads are installed corresponding to the current lead connection terminals 6.

Figure 2:
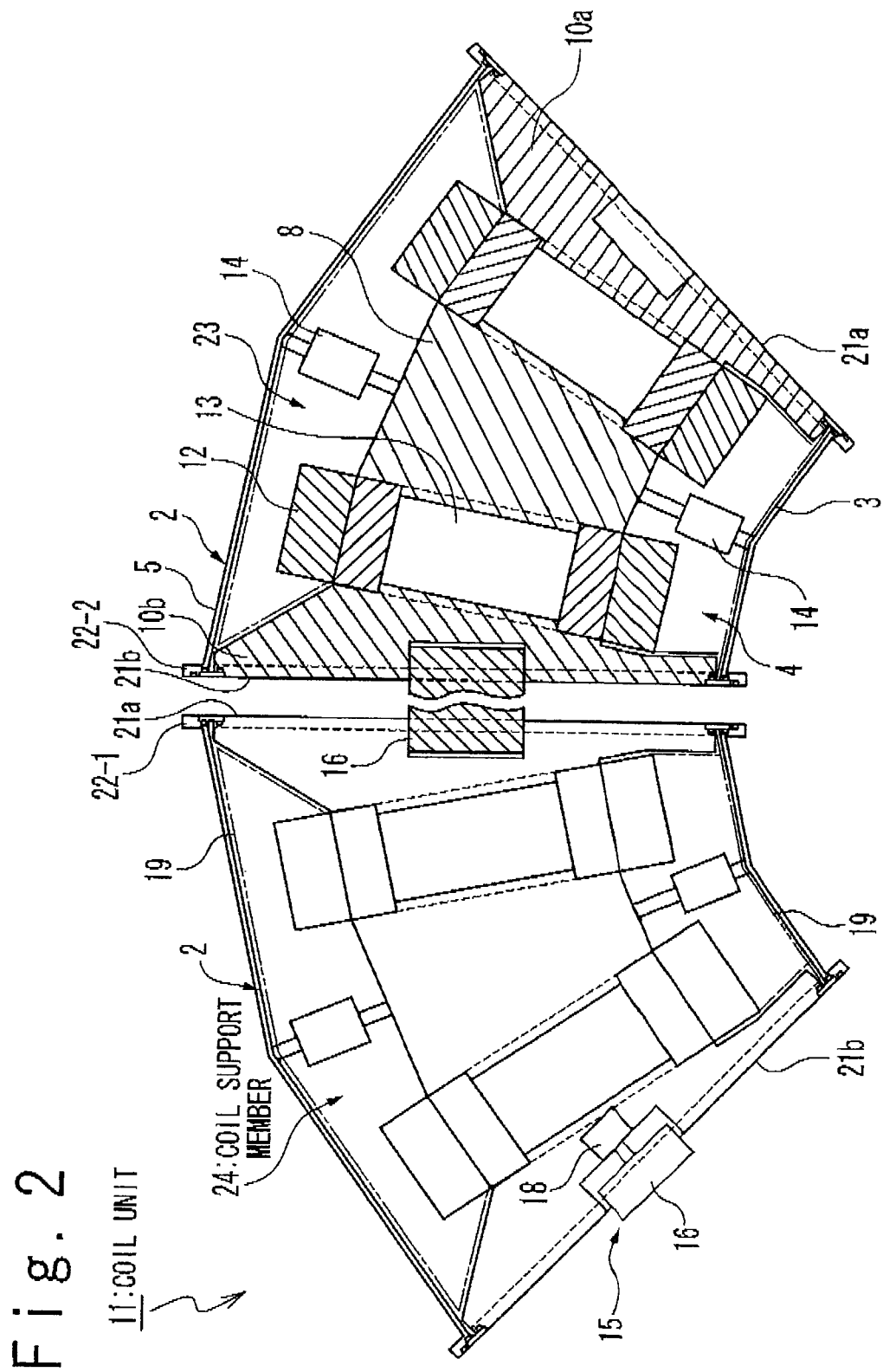
FIG. 2 is a cross-sectional view of coil units as viewed from above.
Figure 3:
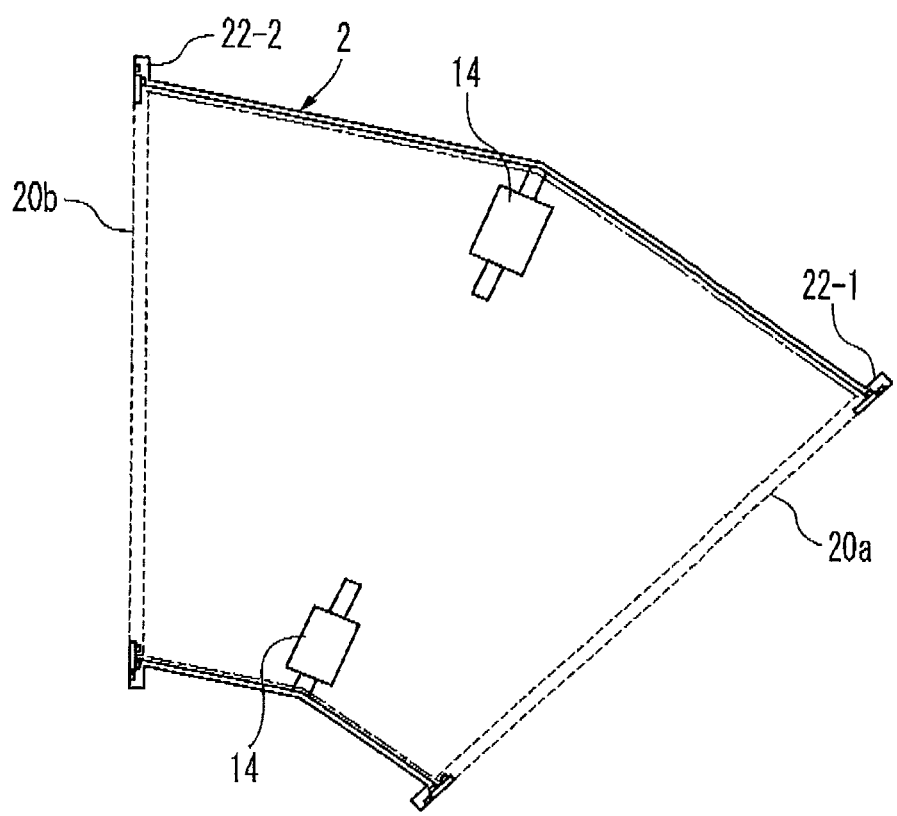
FIG. 3 is a cross-sectional view of a cryostat as viewed from above.

FIG. 2 is a cross-sectional view of two adjacent coil units 11 of the plurality of coil units 11 constituting the superconducting coil device 1 as viewed from above. Each of the coil units 11 is formed by combining the cryostat 2 and a superconducting coil 23. FIG. 3 illustrates only the cryostat 2, and FIG. 4 illustrates only the superconducting coil 23.

The cryostat 2 is arranged on the device circle circumference of the superconducting coil device 1. The cryostat 2 has an inner circumferential surface 3 and an outer circumferential surface 5 that are surfaces substantially along an arc on a concentric circle circumference of the device circle circumference. The cryostat 2 further has: a first end 20a parallel to the radius of the superconducting coil device 1; and a second end 20b that is parallel to the radius of the superconducting coil device 1 and positioned in the device circumferential direction differently from the first end 20a. The angle formed by the first end 20a and the second end 20b is (360/n) degrees (n is an integer representing the number of the coil units 11 constituting the superconducting coil device 1). The second end 20b is positioned on a first direction side in the circumferential direction with respect to the first end 20a. The first end 20a and the second end 20b of the cryostat 2 are opened.

Around the respective openings on a first end 20a side and a second end 20b side of the cryostat 2, flanges 22-1 and 22-2 are provided. The flange 22-2 of one of the coil units 11, and the flange 22-1 of the other coil unit 11 adjacent on the first direction side constitute the flange 22 illustrated in FIG. 1. Inner surfaces of the cryostat 2 are covered with heat shields 19. The cryostat 2 includes inward load biasing devices 14. The inward load biasing devices 14 press and pull the superconducting coil 23 from the outer and inner circumferential sides of the cryostat 2, respectively, to thereby bias horizontal load facing toward the center of the superconducting coil device 1 to the superconducting coil 23. The inward load biasing devices 14 are used for positioning of the superconducting coil 23, or vacuum sealing of a sliding mechanism 25 when inward load does not act, such as at the time of assembling, or no excitation.

Figure 4:
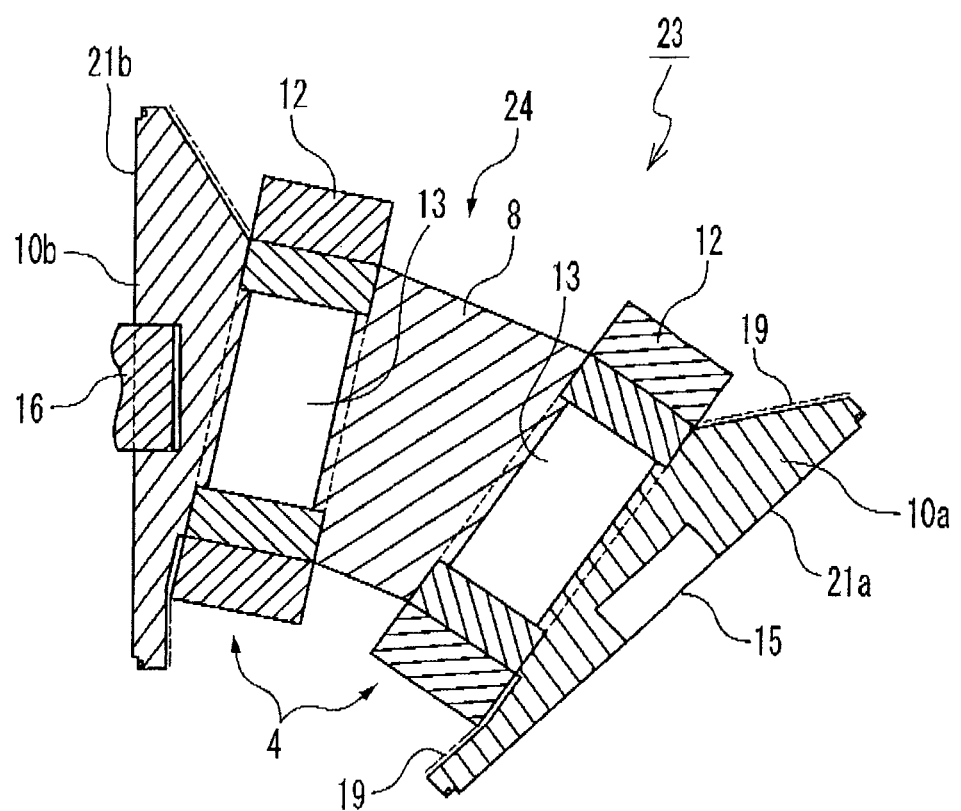
FIG. 4 is a cross-sectional view of a superconducting coil as viewed from above.

The superconducting coil 23 illustrates in FIG. 4 includes a plurality of the element coils 4. The plurality of element coils are arranged in the circumferential direction of the device circle circumference. The element coil 4 includes a coil bobbin 13, and a coil winding 12 that is formed of superconducting wire rod and wound around the coil bobbin 13. FIGS. 2 and 4 illustrate a cross-section of the coil winding 12 in a horizontal plane, respectively. The superconducting coil 23 further includes a coil support member 24. The coil support member 24 is configured to fix an inter-coil spacer 8 and inter-coil spacer/end plates 10a and 10b to the coil bobbin 13. A relative position of the plurality of element coils 4 included in one and the same coil unit 11 is fixed in such a manner that the inter-coil spacer 8 fixes their coil bobbins 13.

The inter-coil spacer/end plate 10a is fixed to the coil bobbin 13, and positioned at the opposite end in the first direction of the coil support member 24. A first surface 21a that is a surface of the inter-coil spacer/end plate 10a on a side opposite to the first direction is parallel to the radius direction of the device circle circumference when the superconducting coil device 1 is configured. The inter-coil spacer/end plate 10b is fixed to the coil bobbin 13, and positioned at the end in the first direction of the coil support member 24. A second surface 21b that is a surface of the inter-coil spacer/end plate 10b on the first direction side is parallel to the radius direction of the device circle circumference when the superconducting coil device 1 is configured. An angle formed by the first surface 21a and the second surface 21b is (360/n) degrees. The first and second surfaces 21a and 21b are respectively provided with connecting parts. In the example illustrated in FIGS. 2 and 4, the connecting parts are depicted as connecting pin parts 15. Each of the connecting pin parts 15 includes a connecting pin 16 and a connecting pin moving device 18. Sides of the inter-coil spacer/end plates 10a and 10b, on which the element coils 4 are arranged, i.e., sides facing to an inside of the coil unit 11 at the time of assembling together with the cryostat 2, are covered with the heat shields 19.

End parts of the inter-coil spacer/end plates 10a and 10b belonging to one and the same coil unit 11 are sandwiched by the guide plate 30 at the first end 20a and the second end 20b of the cryostat 2 such that the first surface 21a and the first end 20a, and the second surface 21b and the second end 20b form substantially the same surfaces, respectively. By moving the superconducting coil 23 toward the center of the superconducting coil device 1 with respect to the cryostat 2 with use of the inward load biasing devices 14, primary vacuum seal parts 29 of the inter-coil spacer/end plates 10a and 10b are brought into contact with the guide plate 30 that is attached to the flanges 22-1 and 22-2 through primary vacuum seal parts 28, and thereby the inter-coil spacer/end plates 10a and 10b shield the open ends of the cryostat 2 to thereby prevent gas outside the coil unit 11 from intruding inside.

Figure 5:
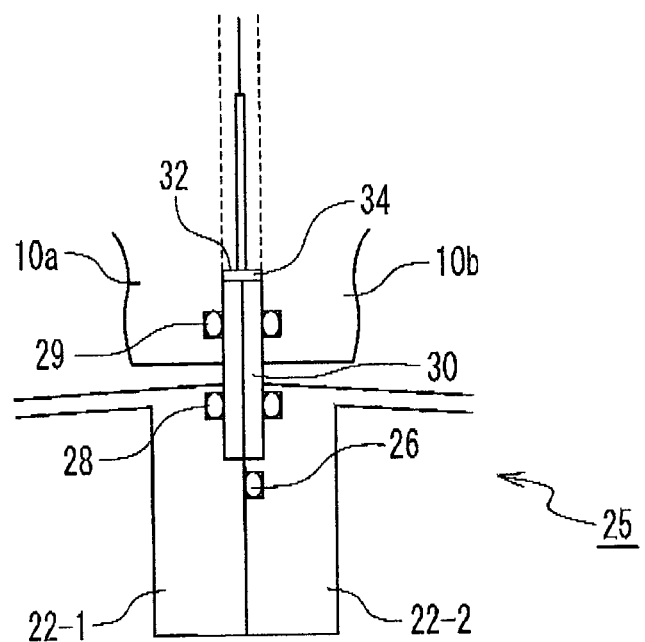
FIG. 5 is an enlarged view of a sliding mechanism.

The first end 20a of each of the coil units 11 comes into surface contact with the second end 20b of a coil unit 11 that is adjacent in a direction opposite to the first direction. At this time, the flange 22-1 of the first end 20a and the flange 22-2 of the second end 20b are combined to constitute the flange 22 illustrated in FIG. 1. The flange 22 is provided with a sliding mechanism. FIG. 5 is an enlarged view of the sliding mechanism 25. The flange 22-1 and the guide plate 30 of one of the coil units 11, and the flange 22-2 and the guide plate 30 of the other coil unit 11 are respectively brought into contact with each other. The first surface 21a of the inter-coil spacer/end plate 10a of the one coil unit 11 and the second surface 21b of the inter-coil spacer/end plate 10b of the other coil unit 11 are brought into contact with each other. The guide plate 30 is plate-shaped and ring-shaped, and inserted into a ring-shaped concave portion that is configured by combining notches provided parallel to each other in outer circumferential portions of the first and second surfaces 21a and 21b. In the state where the guide plate 30 is inserted, a bottom 32 of the concave portion is formed with an annular gap 34. Widths of the gap 34 and the bottom 32 of the concave portion are fabricated slightly wider than the thickness of the corresponding guide plate 30, and thereby the cryostat 2 and the superconducting coil 23, which form one and the same coil unit 11, are slidably connected to each other in the radius direction of the small circle circumference at a corresponding position.

Between the guide plate 30 and the flanges 22-1 and 22-2, the primary vacuum seal parts 28 for preventing gas from intruding are respectively provided. Between the guide plate 30 and the inter-coil spacer/end plates 10a and 10b, the primary vacuum seal parts 29 for preventing gas from intruding are provided. Between the adjacent flanges 22-1 and 22-2, a secondary vacuum seal part 26 for preventing gas from intruding is provided. Such a sliding mechanism 25 enables to relax undesirable influences due to the difference in extension between the cryostat 2 and the coil support member 24, even in a case where such difference occurs due to a variation in temperature, because the superconducting coil 23 is able to move in the radius direction without breaking the vacuum sealing function.

A sealing mechanism based on the secondary vacuum seal part 26 between the flanges 21-1 and 22-2 of the cryostat 2 is used for vacuum insulation between the spacer/end plates 10a and 10b and backup for the primary vacuum sealing at the time when heat shielding plates are attached to flange surfaces upon division and transportation, or assembling in the toroidal shape is complete.

As described above, the vacuum sealing and positioning are achieved by; arranging the superconducting coil 23 so as to be movable in the radius direction; sandwiching the coil bobbin parts from both end sides of the divided cryostat so as to allow the movement with the guide plate having vacuum sealing; and applying load in the inner circumferential direction of the radius direction to achieve.

The coil units 11 each having the above-described configuration are arranged along the device circle circumference to thereby form the toroidal shaped superconducting coil device 1. Specifically, the arrangement is made such that the second surface 21b of the inter-coil space/end plate 10b of each of the coil units 11, and the first surface 21a of the inter-coil spacer/end plate 10a of a coil unit 11 adjacent in the first direction are brought into surface contact with each other. The n coil units 11 are arranged in this manner to thereby form the toroidal shape. The inward load biasing device 14 biases each of the cryostats 2 toward the center of the device circle circumference, and thereby the contact surfaces of adjacent coil units 11 are applied with pressure to bring the coil units into close contact with each other. As a result, the n coil units 11 are supported at predetermined positions in the radius direction of the device circle circumference.

To prevent the occurrence of radius direction relative displacement between superconducting coils of different coil units 11, and erroneous positioning of a coil bobbin in the radius direction upon initial assembling, superconducting coils of adjacent coil units 11 are mutually positioned in the radius direction with a pilot spigot and socket joint, connecting pins 16 or the like provided in the inter-coil spacer/end plates 10a and 10b. FIG. 2 illustrates an example where the connecting pins 16 are employed. The connecting pins 16 are moved by the connecting pin moving devices 18, and thereby a convex portion of the connecting pin part 15 of one of adjacent coil units 11 and a concave portion of the connecting pin part 15 of the other coil unit 11 engage with each other. The engagement fixes a relative position between the respective inter-coil spacer/end plates 10 of the adjacent coil units 11. In particular, the relative position in the radius direction of the device circle circumference is fixed. Based on such a configuration, shifts of relative positions among the superconducting coils of the plurality of coil units 11 are prevented.

In such a radius direction positioning mechanism, the coil unit 11 is preferably configured to be movable in the radius and circumference directions of the toroidal arrangement circle circumference with an electrical or fluidic actuator. Based on such a configuration, each of the coil incorporating containers becomes removable from the toroidal arrangement without moving the installation positions of the other containers upon construction or maintenance.

When such a superconducting coil device 1 is operated, the inside of the cryostat 2 is vacuumed and cooled to low temperature necessary to maintain the superconducting state by the internal superconductor cooling apparatuses 7-1 to 7-4. Further, the current lead cooling apparatuses 9 cool the current leads. Electric current is supplied to the element coils 4 inside the cryostat 2 from outside the device through the current lead connection terminals 6. Based on magnetic force generated by the element coils 4, force acts in a direction in which each of the element coils 4 moves toward inside the device circle circumference, i.e., in a direction in which the circular ring shrinks. As a result, the surfaces of adjacent coil units are compressingly pushed to each other to thereby bring the coil units 11 into close contact with each other. The inward force generated by the element coils 4 is supported by the contact surfaces of the adjacent coil units 11 through the coil supporting members 24.

That is, basically, in the superconducting coil, acting force on the coil winding 12 is not required to be directly individually supported by an external structural system. Vertical load due to the self weight, inward force in, the radius direction of the toroidal arrangement generated in the annular magnetic field, and force in the circumferential direction of the device circle circumference due to the magnetic field unbalance between the divided coils are supported by the coil bobbins 12. The plurality of superconducting coils 23 are integrated on the basis of a wedge structure on end surfaces of the inter-coil spacer/end plates 10a and 10b.

The load acts on end surfaces of the coil bobbin 13 of the toroidal arrangement coil due to electromagnetic force is basically vertical to the surfaces, and therefore load parallel to the surfaces, which causes a shift between the end surfaces, is not theoretically generated. Even if the load parallel to the surfaces is generated because of error in shape, any displacement due to relative sliding does not occur because of frictional force between the end surfaces. By providing the connecting pin parts 15, the prevention of the displacement and the centering of the coil are further surely achieved.

In such a superconducting coil device, evacuation and cooling by a cryogenic cooling device can be performed individually for each of the plurality of divided toroidal containers. Further, mutual connection/assembling or disassembling of the coil units 11 can be performed in the state where initial cooling necessary to maintain the superconducting state is complete. The disassembling can be performed in such a manner that the engagement of the connecting pins 16 is released by the connecting pin moving devices 18, and the mutual connection between the flange parts 22-1 and 22-2 of the cryostat 2 is released to remove the coil unit 11 toward outside the device circle circumference.

Further, when the superconducting coil device 1 as illustrated in FIG. 1 is in operation, a coil unit 11 for backup can be additionally prepared. The backup coil unit 11 is prepared with being independently evacuated and cooled, and thereby if one would like to replace or maintain a part of the superconducting coil device 1, he/she can replace the part by the coil unit 11 for backup to thereby resume the operation in a short time without affecting other coil units 11.

A structural system that supports the coil from the outer diameter side of the coil winding 12 is not required, and therefore even if the number of the divided coils is increased, or not linearly arranged, they can be easily supported.

According to such a superconducting coil device, the work period can be shortened, and maintenance, replacement, and resumption of use can be performed in a short time on the basis of the attachment of the heat shielding plates to the flange parts at the both ends of the coil units from outside, and waiting after the completion of cooling by the operation of a cryogenic cooling device using an electrical generator or an commercial power supply after assembling in a factory, before delivery, during transportation, or at the time of storage on site before assembling, Further, when installing the coil in a cryostat, the work can be easily performed without entering inside of the completed container from the flange opening.

After development, prototyping, and verification of a single body of the divided coil unit, final verification in the toroidal arrangement can be performed. For this reason, there is obtained an advantage that development results can be easily built up on a step-by-step basis.

What is claimed is:

1. A superconducting coil device, comprising:
   a plurality of coil units arranged in a circle to form a toroidal shape,
   wherein each of the plurality of coil units comprises:
      a cryostat;
      a superconducting coil, comprising:
         a plurality of superconducting element coils stored in the cryostat, and respectively comprising a plurality of coil bobbins and a plurality of superconducting coil windings wound around the corresponding coil bobbins;
         an inter-coil spacer stored in the cryostat between adjacent two of the plurality of coil bobbins to support the adjacent two coil bobbins;
         a first end member stored in the cryostat to support a leftmost coil bobbin among the plurality of coil bobbins, the first end member defining a first side surface of the coil unit; and
         a second end member stored in the cryostat to support a rightmost coil bobbin among the plurality of coil bobbins, the second end member defining a second side surface of the coil unit; and
      an inward load biasing device stored in the cryostat to bias the superconducting coil toward a center of the circle when the plurality of superconducting element coils is not excited, and
   wherein, for each of the plurality of coil units,
      the first side surface is parallel with a radial direction of the circle, and the second side surface is parallel with another radial direction the of the circle and arranged opposite to the first side surface in a circumferential direction of the circle,
      the angle formed by the first side surface and the second side surface is 360/n degrees, where n is an integer representing the number of the plurality of coil units constituting the superconducting coil device,
      the first side surface is in direct surface contact with the second side surface of an adjacent coil unit among the plurality of coil units on a first side in the circumferential direction of the circle, and
      the second side surface is in direct surface contact with the first side surface of another adjacent coil unit among the plurality of coil units on a second, opposite side in the circumferential direction of the circle.

2. The superconducting coil device according to claim 1, wherein the superconducting coil is configured to be biased toward the center of the circle by an attractive electromagnetic force generated by the plurality of superconducting element coils when the plurality of superconducting element coils is excited, and
   each of the plurality of coil units is supported in a predetermined radial position in the circle by having the corresponding first side surface being pushed against the second side surface of the adjacent coil unit on the first side, and the corresponding second side surface being pushed against the first side surface of the another adjacent coil unit on the second side.

3. The superconducting coil device according to claim 2, wherein the superconducting coil winding of each of the plurality of superconducting element coils includes a superconducting wire rod wound around a central axis of the device in the circumferential direction at a corresponding position where the wire rod is arranged.

4. The superconducting coil device according to claim 1, wherein, in each of the plurality of coil units, the leftmost coil bobbin is fixed to the first end member on the first side and to the inter-coil spacer on the second side.

5. The superconducting coil device according to claim 4, wherein, in each of the plurality of coil units, the rightmost coil bobbin is fixed to the second end member on the second side and to the inter-coil spacer on the first side.

6. The superconducting coil device according to claim 1, further comprising:
   a plurality of connecting parts that respectively fix relative radial positions of the first and second end members of the adjacent coil units at the first side surface and the second side surface.

7. The superconducting coil device according to claim 1, further comprising:
   a sliding mechanism configured to slidably connect the plurality of superconducting element coils to the cryostat in each of the plurality of coil units while keeping airtightness of the cryostat,
   wherein the sliding mechanism is arranged in opposing flanges of the cryostats of two adjacent coil units.

8. The superconducting coil device according to claim 1, wherein each of the plurality of coil units comprises a plurality of cooling apparatuses configured to cool the plurality of superconducting element coils, and the plurality of cooling apparatuses are arranged along an inner circumference of the toroidal shape, and
   wherein the plurality of cooling apparatuses and the cryostat are combined to form one coil unit.

9. The superconducting coil device according to claim 1, wherein each pair of the first and second side surfaces in direct surface contact with each other extends from an inner circumference of the toroidal shape to an outer circumference of the toroidal shape.

* * * * *